US009396236B1

(12) United States Patent
Vanderwater et al.

(10) Patent No.: US 9,396,236 B1
(45) Date of Patent: Jul. 19, 2016

(54) RANKING USERS BASED ON CONTEXTUAL FACTORS

(71) Applicant: Google Inc., Mountain View, CA (US)

(72) Inventors: Kathryn Rose Vanderwater, Plainfield, IL (US); Frances Bordwell Haugen, Mountain View, CA (US); Alexander Ketner Unger, San Francisco, CA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 14/145,694

(22) Filed: Dec. 31, 2013

(51) Int. Cl.
*G06F 17/30* (2006.01)

(52) U.S. Cl.
CPC .................................. *G06F 17/3053* (2013.01)

(58) Field of Classification Search
CPC .................................................. G06F 17/3053
USPC .......................................................... 707/732
See application file for complete search history.

(56) References Cited

U.S. PATENT DOCUMENTS

| | | | |
|---|---|---|---|
| 5,802,493 A | 9/1998 | Sheflott et al. | |
| 7,899,915 B2 | 3/2011 | Reisman | |
| 8,301,692 B1 * | 10/2012 | Hamaker | G06Q 30/0631 705/26.7 |
| 8,458,195 B1 * | 6/2013 | Procopio | G06F 17/30867 707/749 |
| 8,468,143 B1 * | 6/2013 | Oztekin | G06F 17/30554 707/706 |
| 8,473,499 B2 * | 6/2013 | Song | G06Q 50/10 706/20 |
| 8,660,849 B2 | 2/2014 | Gruber et al. | |
| 8,670,979 B2 | 3/2014 | Gruber et al. | |
| 8,676,937 B2 | 3/2014 | Rapaport et al. | |
| 8,935,192 B1 * | 1/2015 | Ventilla | G06N 5/04 706/45 |
| 2003/0004909 A1 * | 1/2003 | Chauhan | G06N 5/043 706/45 |
| 2003/0050840 A1 * | 3/2003 | Nakajima | G06F 17/3089 705/14.46 |
| 2006/0064637 A1 * | 3/2006 | Rechterman | G06F 17/30905 715/205 |
| 2007/0118399 A1 | 5/2007 | Avinash et al. | |

(Continued)

OTHER PUBLICATIONS

El-korany, A., "Integrated Expert Recommendation Model for Online Communities", International Journal of Web & Semantic Technology (IJWesT), vol. 4, No. 4, Oct. 2013, pp. 19-29.*

(Continued)

*Primary Examiner* — Phuong Thao Cao

(74) *Attorney, Agent, or Firm* — Fish & Richardson P.C.

(57) ABSTRACT

Methods for ranking users based on contextual factors are provided. An example method may include receiving an online question by an asking user. The method may further include identifying one or more topics of the received online question. The method may further include identifying a set of candidate answering users from a plurality of users based on an expertise level of each user of the plurality of users, wherein the expertise level is related to the identified one or more topics of the received online question. In addition, the method may include ranking the set of candidate answering users based on a commonality of one or more contextual factors between the asking user and the set of candidate answering users, wherein the one or more contextual factors are distinct from the identified one or more topics. Systems and computer-readable media for ranking users based on contextual factors are also described.

19 Claims, 5 Drawing Sheets

(56) References Cited

U.S. PATENT DOCUMENTS

| | | | | |
|---|---|---|---|---|
| 2007/0156664 | A1* | 7/2007 | Norton | G06Q 10/10 |
| 2009/0006398 | A1* | 1/2009 | Lam | G06Q 30/02 |
| 2009/0006469 | A1* | 1/2009 | Jain | G06Q 30/02 |
| 2010/0005105 | A1* | 1/2010 | Zhang | G06Q 30/02 707/E17.021 |
| 2010/0030859 | A1* | 2/2010 | Huang | G06F 17/30905 709/206 |
| 2010/0070554 | A1* | 3/2010 | Richardson | G06Q 10/06 709/202 |
| 2010/0131265 | A1* | 5/2010 | Liu | G06F 17/30867 704/9 |
| 2010/0228614 | A1* | 9/2010 | Zhang | G06Q 10/10 705/14.16 |
| 2010/0228631 | A1* | 9/2010 | Zhang | G06Q 30/0269 705/14.66 |
| 2011/0055207 | A1* | 3/2011 | Schorzman | G06F 17/30699 707/723 |
| 2011/0106746 | A1* | 5/2011 | Ventilla | H04L 51/046 706/50 |
| 2011/0125734 | A1 | 5/2011 | Duboue et al. | |
| 2011/0145093 | A1* | 6/2011 | Paradise | G06Q 30/02 705/26.41 |
| 2011/0202400 | A1* | 8/2011 | Bedard | G06F 17/30867 705/14.19 |
| 2011/0252021 | A1* | 10/2011 | Clark | G06F 17/30867 707/722 |
| 2012/0023170 | A1* | 1/2012 | Matignon | G06Q 10/0637 709/205 |
| 2012/0095977 | A1* | 4/2012 | Levin | G06Q 30/02 707/706 |
| 2012/0095978 | A1* | 4/2012 | Levin | G06Q 30/02 707/706 |
| 2012/0124478 | A1 | 5/2012 | King et al. | |
| 2012/0272164 | A1* | 10/2012 | Polonsky | G06Q 10/10 715/753 |
| 2012/0290950 | A1 | 11/2012 | Rapaport et al. | |
| 2013/0024307 | A1* | 1/2013 | Fuerstenberg | G06Q 20/405 705/18 |
| 2013/0040277 | A1* | 2/2013 | Linton | G06Q 10/101 434/350 |
| 2013/0054407 | A1* | 2/2013 | Sabur | G06Q 50/01 705/26.7 |
| 2013/0086082 | A1* | 4/2013 | Park | G06F 17/30867 707/748 |
| 2013/0097178 | A1* | 4/2013 | Song | G06Q 50/10 707/748 |
| 2013/0117071 | A1* | 5/2013 | Kwon | G06Q 30/0241 705/7.32 |
| 2013/0159325 | A1* | 6/2013 | Polonsky | G06F 17/30699 707/754 |
| 2013/0246327 | A1* | 9/2013 | Tabrizi | G06Q 30/01 706/50 |
| 2013/0254007 | A1* | 9/2013 | Cockcroft | G06Q 30/02 705/14.25 |
| 2013/0263016 | A1* | 10/2013 | Lehtiniemi | G06T 19/006 715/753 |
| 2013/0297545 | A1* | 11/2013 | Bierner | G06Q 50/00 706/46 |
| 2013/0297553 | A1 | 11/2013 | Bierner | |
| 2013/0297625 | A1* | 11/2013 | Bierner | G06F 17/30634 707/754 |
| 2013/0297927 | A1* | 11/2013 | Bora | G06F 9/4421 713/100 |
| 2014/0040715 | A1* | 2/2014 | Younge | G06F 17/24 715/203 |
| 2014/0047045 | A1* | 2/2014 | Baldwin | H04L 67/306 709/206 |
| 2014/0074545 | A1* | 3/2014 | Minder | G06Q 50/01 705/7.27 |
| 2014/0119531 | A1* | 5/2014 | Tuchman | H04M 3/5166 379/265.09 |
| 2014/0122612 | A1* | 5/2014 | Wu | H04L 51/32 709/205 |
| 2014/0156463 | A1* | 6/2014 | Hui | G06Q 30/0621 705/26.61 |
| 2014/0207794 | A1* | 7/2014 | Du | H04L 51/32 707/748 |
| 2014/0214820 | A1* | 7/2014 | ODonnell | G06F 17/3061 707/726 |
| 2014/0222907 | A1* | 8/2014 | Seligmann | H04L 65/1069 709/204 |
| 2014/0250134 | A1* | 9/2014 | Jones | G06F 17/3053 707/748 |
| 2014/0257890 | A1* | 9/2014 | Polonsky | G06Q 10/063 705/7.11 |
| 2014/0280237 | A1* | 9/2014 | Salkola | G06Q 10/10 707/749 |
| 2014/0297658 | A1* | 10/2014 | Kanigsberg | G06F 17/30867 707/750 |
| 2014/0310288 | A1* | 10/2014 | Jockisch | G06F 17/3053 707/748 |
| 2014/0310329 | A1* | 10/2014 | Jones | H04L 67/306 709/201 |
| 2014/0310614 | A1* | 10/2014 | Jones | H04L 67/306 715/753 |
| 2014/0344718 | A1 | 11/2014 | Rapaport et al. | |
| 2014/0351263 | A1* | 11/2014 | McConnell | G06F 17/30699 707/748 |
| 2014/0358928 | A1 | 12/2014 | Alkov et al. | |
| 2014/0359421 | A1 | 12/2014 | Allen et al. | |
| 2014/0365502 | A1 | 12/2014 | Haggar et al. | |
| 2015/0088906 | A1* | 3/2015 | Pal | G06Q 50/01 707/749 |
| 2015/0100509 | A1* | 4/2015 | Pappas | G06F 17/30867 705/319 |
| 2015/0120718 | A1* | 4/2015 | Luo | G06F 17/30699 707/728 |
| 2015/0161230 | A1* | 6/2015 | Alkov | G06F 17/30705 707/737 |

OTHER PUBLICATIONS

Liu et al., "Finding Experts in Community-Based Question-Answering Services", CIKM' 05, Oct. 31-Nov. 5, 2005, Bremen, Germany, 2 pages.*

Riahi et al., "Finding Expert Users in Community Question Answering", WWW 2012-CQA' 12 Workshop, Apr. 16-20, 2012, Lyon, France, pp. 791-798.*

White et al., "Effects of Expertise Differences in Synchronous Social Q&A", SIGIR' 12, Aug. 12-16, 2012, Portland, Oregon, USA, 2 pages.*

Li et al., "Routing Questions to Appropriate Answerers in Community Question Answering Services", In Proceedings of the 19th ACM International Conference on Information and Knowledge Management (CIKM' 10), pp. 1585-1588, 2010.*

Macdonald et al., "Voting Techniques for Expert Search", Knowledge Information System (2008) 16: pp. 259-280, 2008.*

Mansilla et al., "Question Waves: A Multicast Query Routing Algorithm for Social Search", Information Sciences 253 (2013): pp. 1-25, 2013.*

Yimam-Seid et al., "Expert Finding Systems for Organizations: Problem and Domain Analysis and the DEMOIR Approach", Journal of Organizational Computing and Electronic Commerce 13(1), 2003, pp. 1-24.*

Zhou et al., "Routing Questions to the Right Users in Online Communities", IEEE International Conference on Data Engineering, IEEE Computer Society, pp. 700-711, 2009.*

Atkinson, et al., "Evolutionary optimization for ranking how-to questions based on user-generated contents," Expert systems with Applications, Dec. 2013, vol. 40, No. 17, pp. 7060-7068.

Dror, et al., "I Want to Answer, Who Has a Question? Yahoo! Answers Recommender System," Aug. 2011, Proceedings of the 17th ACM SIGKDD International Conference on Knowledge Discovery and Data Mining, pp. 1109-1117.

John, et al., "What Makes a High-Quality User-Generated Answer?" IEEE Internet Computing, Jan./Feb. 2011, vol. 15, No. 1, pp. 66-71.

* cited by examiner

RANKING USERS BASED ON CONTEXTUAL FACTORS

BACKGROUND

Online networks generally allow users to connect and share information with people in their network. In an online network, information or knowledge that is required to answer one user's question may be challenging to obtain online or reside offline in the minds of one or more other users. Some networks have attempted to solicit a user's friends to answer the user's questions. However, such an approach is limited by the probability that the user's friends are not available or do not have the requisite knowledge to assist or answer the question. Nevertheless, it may be desirable for an online network or service to provide users with a way to receive prompt and accurate answer to their questions.

SUMMARY

The present disclosure relates generally to online queries, and more particularly to techniques related to online question answering using real-time network interaction technologies. The disclosed subject matter relates to computer-implemented methods for ranking candidate answering users to answer an asking user's online question. An example method may comprise receiving an online question by an asking user. The method may further comprise identifying one or more topics of the received online question. The method may further comprise identifying a set of candidate answering users from a plurality of users based on an expertise level of each user of the plurality of users, wherein the expertise level is related to the identified one or more topics of the received online question. In addition, the method may comprise ranking the set of candidate answering users based on a commonality of one or more contextual factors between the asking user and the set of candidate answering users, wherein the one or more contextual factors are distinct from the identified one or more topics.

Another example method may comprise receiving an online question by an asking user. The method may further comprise identifying one or more topics of the received online question. The method may further comprise identifying a set of candidate answering users from a plurality of users based on an expertise level of each user of the plurality of users, wherein the expertise level is related to the identified one or more topics of the received online question. The method may further comprise determining whether the identified one or more topics of the received online question are subjective topics. In addition, the method may comprise ranking, when at least one topic of the identified one or more topics of the received online question is determined to be subjective, the set of candidate answering users based on a commonality of one or more contextual factors between the asking user and the set of candidate answering users, wherein the one or more contextual factors are distinct from the identified one or more topics.

The disclosed subject matter further relates to systems for ranking candidate answering users to answer an asking user's online question. An example system may comprise one or more processors, and a memory including instructions that, when executed by the one or more processors, cause the one or more processors to perform operations. The one or more processors of the system may be configured to receive an online question by an asking user. The one or more processors of the system may be further configured to identify one or more topics of the received online question. The one or more processors of the system may be further configured to identify a set of candidate answering users from a plurality of users based on an expertise level of each user of the plurality of users, wherein the expertise level is related to the identified one or more topics of the received online question. In addition, the one or more processors of the system may be configured to rank the set of candidate answering users based on a commonality of one or more contextual factors between the asking user and the set of candidate answering users, wherein the one or more contextual factors are distinct from the identified one or more topics.

In another example system, the one or more processors of the system may be configured to receive an online question by an asking user. The one or more processors of the system may be further configured to identify one or more topics of the received online question. The one or more processors of the system may be further configured to identify a set of candidate answering users from a plurality of users based on an expertise level of each user of the plurality of users, wherein the expertise level is related to the identified one or more topics of the received online question. The one or more processors of the system may be further configured to determine whether the identified one or more topics of the received online question are subjective topics. In addition, the one or more processors of the system may be configured to rank, when at least one topic of the identified one or more topics of the received online question is determined to be subjective, the set of candidate answering users based on a commonality of one or more contextual factors between the asking user and the set of candidate answering users, wherein the one or more contextual factors are distinct from the identified one or more topics.

The disclosed subject matter also relates to example machine-readable media comprising instructions stored therein, which when executed by a system, cause the system to perform operations for ranking candidate answering users to answer an asking user's online question. An example machine-readable medium may comprise instructions for receiving an online question by an asking user. The machine-readable medium may further comprise instructions for identifying one or more topics of the received online question. The machine-readable medium may further comprise instructions for identifying a set of candidate answering users from a plurality of users based on an expertise level of each user of the plurality of users, wherein the expertise level is related to the identified one or more topics of the received online question. The machine-readable medium may further comprise instructions for ranking the set of candidate answering users based on a commonality of one or more contextual factors between the asking user and the set of candidate answering users, wherein the one or more contextual factors are distinct from the identified one or more topics. In addition, the machine-readable medium may comprise instructions for ranking a first candidate answering user of the set of candidate answering users higher than a second candidate answering user of the set of candidate answering users, wherein the commonality of one or more contextual factors is greater between the first candidate answering user and the asking user than between the second candidate answering user and the asking user, and wherein the expertise level of the first candidate answering user is lower than the expertise level of the second candidate answering user.

Another example machine-readable medium may comprise instructions for receiving an online question by an asking user. The machine-readable medium may further comprise instructions for identifying one or more topics of the received online question. The machine-readable medium may further comprise instructions for identifying a set of candidate answering users from a plurality of users based on an expertise level of each user of the plurality of users, wherein the expertise level is related to the identified one or more topics of the received online question. The machine-readable medium may further comprise instructions for determining whether the identified one or more topics of the received online question are subjective topics. In addition, the machine-readable medium may comprise instructions for ranking, when at least one topic of the identified one or more topics of the received online question is determined to be subjective, the set of candidate answering users based on a commonality of one or more contextual factors between the asking user and the set of candidate answering users, wherein the one or more contextual factors are distinct from the identified one or more topics.

These and other aspects may provide several advantages including, but not limited to, connecting an asking user of an online question with one or more users who have been determined to possess similar contextual factors (e.g., quasi-demographical relationships, similar affiliations, commonality in the products or items that users own, commonality in experiences shared by users, etc.) as determined from aggregated historical data and inferences drawn from such data. Thus, relevant real-time answers from knowledgeable and similarly situated or experienced users can be provided to the asking user's online question.

In this regard, a question answering system or service can more effectively connect users and increase the likelihood that an asking user will be connected to answering users who will provide online answers that are relevant to the context of the online question.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
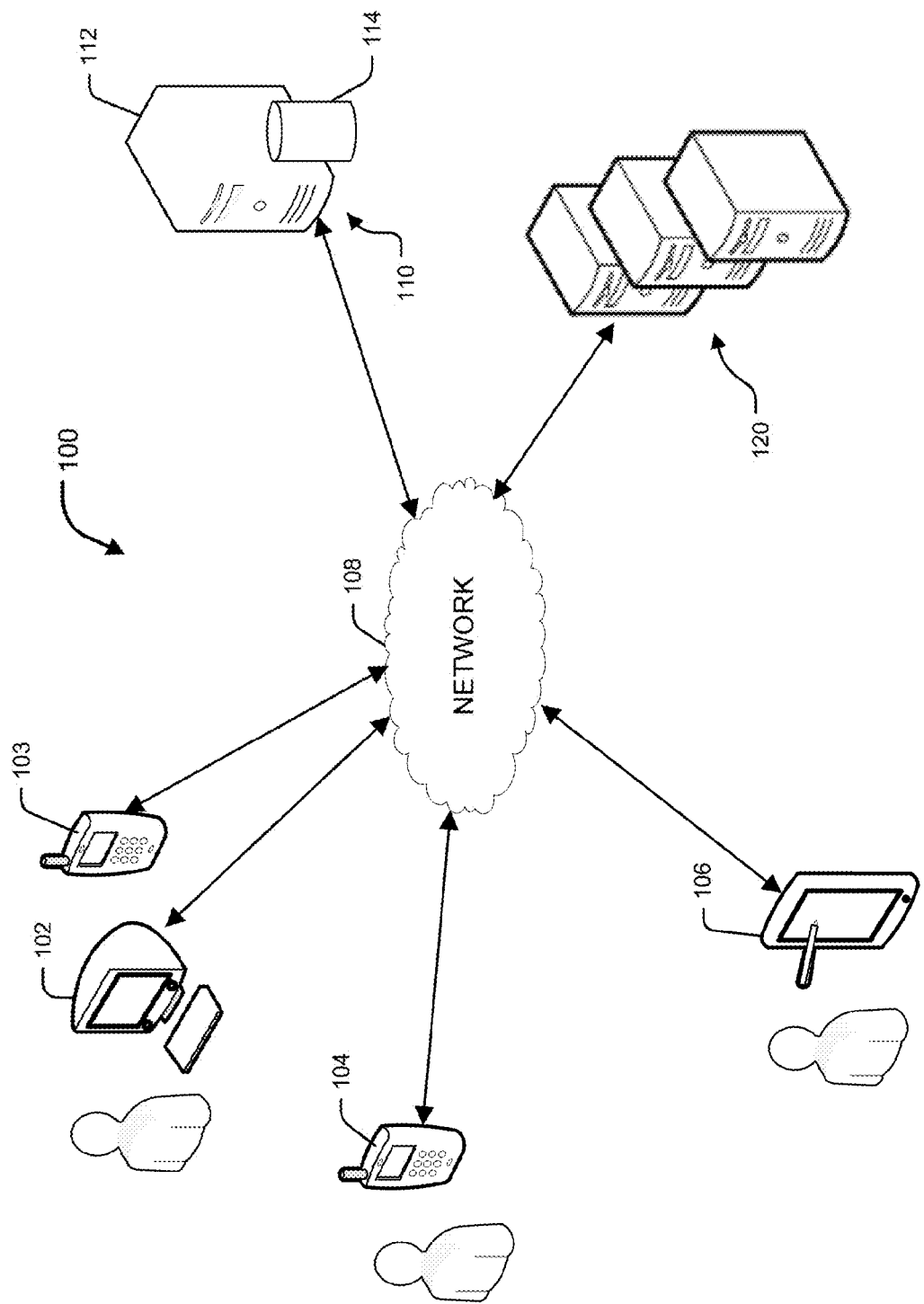
FIG. 1 illustrates an example client-server network environment for supporting real-time network interaction technologies in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, well-known structures and components are shown in block diagram form in order to avoid obscuring the concepts of the subject technology.

In accordance with various aspects of the subject technology, the present disclosure describes techniques for ranking users to answer another user's online question. For example, a user of a system (e.g., social networking system or service, searching system or service, email system or service, mapping system or service, etc.) may have a question to which he or she wants an answer. In some instances, the user may be attempting to perform a search query and unable to obtain successful results; whereas, in other instances, the user may be seeking an immediate answer to his or her question. In either case, selecting and ranking candidate answering users that are knowledgeable and have matching contextual factors with the asking user can be an important aspect of a system for connecting users together to ask and answer online questions.

Techniques are described to increase the relevancy of responses to an asking user's online question by ranking based on contextual factor (e.g., quasi-demographical characteristics, affiliation attributes, product ownership attributes, experience attributes, etc.) associated with each user of a plurality of users in a system or service. When ranking candidate answering users, contextual factors may be used in conjunction with other factors such as the expertise level of the candidate answering user.

In this regard, certain human relationship and experience aspects embodied in one or more contextual factors may be incorporated into the ranking process thereby increasing the likelihood that an asking user will receive a relevant answer to his or her online question. Moreover, candidate answering users who are both knowledgeable with regard to the topic of the online question and have matching or similar contextual factors as the asking user may be better situated to answer follow-up questions to the asking user's online question than other candidate answering users who may also be deemed knowledgeable.

In some aspects, the weighing or use of contextual factors may be related to the type of online question being asked. For example, contextual factors may be applied only to or given greater weight when the received online question is predominantly subjective in nature. Matching of contextual factors can be important when the asking user's online question is a substantially subjective question for at least the reason that such subjective questions may relate to matters of style, taste or preference, for which no objectively correct answer generally exists.

Consequently, real-time interaction technologies may be used in conjunction with aggregated historical data to connect an asking user with one or more candidate answering users by ranking based on contextual factors in addition to an expertise level of the candidate answering users.

FIG. 1 illustrates an example client-server network environment which may support real-time network interaction technologies and be used to implement various techniques for ranking users based on contextual factors and expertise levels to answer a user's online question. Network environment 100 may include a number of electronic devices 102, 103, 104, 106 communicably connected to server 110, such as by network 108. In other examples, electronic devices 102, 103, 104, 106 may be communicably connected to one another, such as by network 108, but not communicably connected to server 110. In some examples, the server 110 may host a question answering system or service.

Each of the one or more remote servers 120 can be a single computing device such as a computer server or can represent more than one computing device working together to perform the actions of a server computer (e.g., cloud computing). Each of the one or more remote servers 120 may host one or more systems or services including but not limited to user profiles comprising historical data, expertise and interest information, and network activity information, or may host one or more applications for maintaining analytics information regarding such user profiles and aspects with respect one or more systems or services.

Network 108 may be a public communication network, a private communications network, or a combination of both. In certain examples, network 108 can include any one or more of a personal area network (PAN), a local area network (LAN), a campus area network (CAN), a metropolitan area network (MAN), a wide area network (WAN), a broadband network (BBN), the Internet, and the like. Further, network 108 can include, but is not limited to, any one or more of the following network topologies, including a bus network, a star network, a ring network, a mesh network, a star-bus network, tree or hierarchical network, and the like.

Network 108 may be a public communication network (including, but not limited to, the Internet, cellular data network, cable data network, or dialup modems over a public switched telephone network) or a private communications network (such as, for example, private local area network ("LAN") or leased-line network). Network 108 may also include, but is not limited to, any one or more of the following network topologies, including a bus network, a star network, a ring network, a mesh network, a star-bus network, a tree or hierarchical network, and the like.

In some implementations, electronic devices 102, 103, 104 and 106 can be computing devices such as laptop or desktop computers, smartphones, personal digital assistants ("PDAs"), portable media players, tablet computers, televisions or other displays with one or more processors coupled thereto or embedded therein, or other appropriate computing devices that can be used to for displaying a web page or web application. In the example of FIG. 1, electronic device 102 is depicted as a desktop computer, electronic devices 103, 104 are depicted as smartphones, and electronic device 106 is depicted as a tablet device.

In certain examples, server 110 includes one or more processing devices 112 and data store 114. The one or more processing devices 112 may execute computer instructions stored in data store 114, for example, to rank users based on contextual factors, and provide online question and answering routing to one or more of electronic devices 102, 103, 104, 106. Data store 114 may store the computer instructions on non-transitory computer-readable medium.

In certain examples, server 110 may be a single computing device such as a computer server. In other examples, server 110 may represent more than one computing device working together to perform the actions of a server computer (e.g., a cloud of computers or a distributed system). In another example, server 110 may be coupled with various databases, storage services, or other computing devices. Server 110 and the coupled databases, storage services, or other computing devices may be collocated, or may be disparately located.

Communications between electronic devices 102, 103, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 103, 104, 106 and server 110. In other examples, electronic devices 102, 103, 104, 106 may be in communication with one another without communicating with server 110.

A user interacting with a client device (e.g., electronic devices 102, 103, 104, or 106) may perform one or more activities with respect to his or her profile at a system or service (e.g., a service hosted at one or more remote servers 120). Question answering system (e.g., hosted at server 110) may receive information regarding interactions of one or more other users of the service (e.g., users interacting with one or more client devices) with respect to the activity of both question asking users and answering users, and may analyze the interactions to provide various ranking and routing decisions, for example.

The phrase "online question" as used herein encompasses its plain and ordinary meaning including but not limited to a message communicating at least one question from at least one of electronic devices 102, 103, 104, 106, where each electronic device 102, 103, 104, 106 may transmit text, audio, or video streams. Additionally, each electronic device 102, 103, 104, 106 may receive text, audio, or video streams from at least one other of electronic devices 102, 103, 104, 106 in response to the online question. Accordingly, electronic devices 102, 103, 104, 106, may include, or may be coupled to, a microphone, camera, or other device for capturing audio or video, and may include an output device for providing text, audio, or video.

In operation, server 110 (alone or in conjunction with servers 120) may provide and process algorithms or operations for ranking users of electronic devices 102, 103, 104, 106 based on contextual and expertise levels. Server 110 may route an online question to one or more users, such as by hosting a question answering system. Electronic devices 102, 103, 104, 106 may each establish a communications with server 110 or servers 120, for purposes of participating in the question answering system or service. A user interacting with one of electronic devices 102, 103, 104, 106, such as electronic device 106, may transmit a request to server 110 indicating that the user would like to ask an online question to be answered by a user of another device (e.g., electronic devices 102, 103, or 104). Additionally, in some implementations, server 110 may transmit a request to a user interacting with one of electronic devices 102, 103, 104, 106, such as electronic device 106, indicating whether the user would like to ask an online question to be answered by a user of another device (e.g., electronic devices 102, 103, or 104).

In response to receiving an online question from electronic device 106, server 110 or servers 120 may select and rank active target devices to which the user may be a potential candidate answering user. In certain examples, server 110 or servers 120 may route the online question to one or more candidate answering users of the question answering system. Server 110 or servers 120 may continually determine the state and activity of electronic devices 102, 103, 104 of each of the candidate answering users in order to re-rank users and reroute the online question.

In some examples, server 110 or servers 120 may receive a follow-up online question by at least one of the candidate answering users (e.g., from electronic devices 102, 103, 104) and route the follow-up online question to the initial asking user (e.g., to electronic device 106). Methods of selecting and ranking candidate answering users, and routing an online question thereto, are further described below with respect to FIGS. 2-4 and continued reference to FIG. 1.

Figure 2:
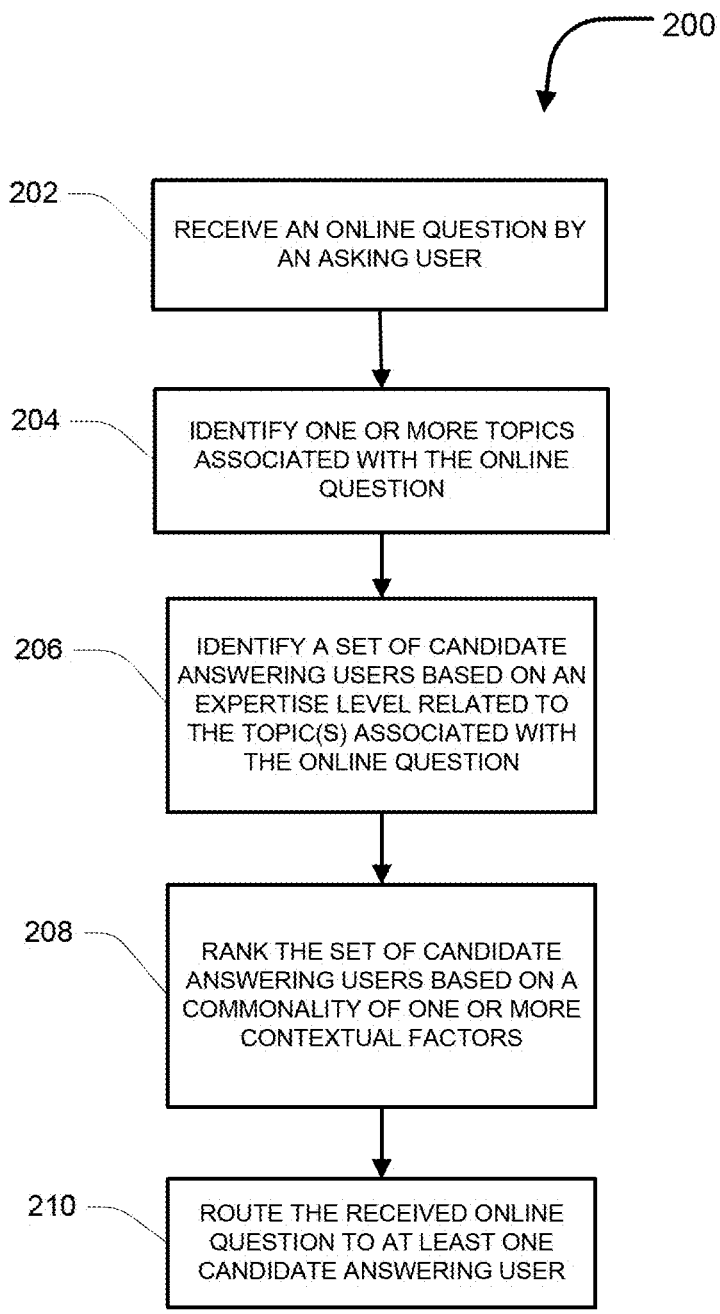
FIG. 2 is a flow diagram illustrating an example method for providing answers to online questions using contextual factor ranking techniques in accordance with various aspects of the subject technology.

FIG. 2 illustrates a flow diagram of an example method for providing answers to online questions using contextual factor ranking techniques. It is to be understood that the operations in method 200 may be used in conjunction with other methods and aspects of the present disclosure. Although method 200 is described with relation to system of FIG. 1, method 200 is not limited to such. In method 200, hosting device, such as server 110, may provide a question answering system of a system or service to one or more participant devices, including but not limited to electronic devices 102, 103, 104, 106. For the explanatory purposes, electronic devices 102, 103, 104 may be associated with an answering user of a previously asked online question or a candidate answering users of an asked online question. Additionally, electronic device 106 may be associated with an asking user (e.g., the user who has previously asked or is asking an online question to be answered directly by other users of the question answering system or service). Each of the electronic devices 102, 103, 104, 106 may establish an individual multimedia session with server 110. Each of electronic devices 102, 103, 104, 106 may further connect to each other via the server 110, or may establish a connection with each other directly via associated network connectivity.

In block 202, an online question by an asking user (e.g., electronic device 106) may be received by server 110. Various techniques may be employed to ask and answer the online question, for example, via a screen associated with a specific application, online messaging communication, email, or the like.

In block 204, one or more topics of the online question may be identified. The topics may be determined by analyzing one or more text strings of the online question or other cross-referencing techniques.

In block 206, candidate answering users (e.g., electronic devices 102, 103, 104) may be identified based on an expertise level of each user of the plurality of users. The expertise associated with the expertise level may be matched or related to the identified one or more topics of the received online question.

In block 208, the set of candidate answering users may be ranked based on a commonality of one or more contextual factors between the asking user and the set of candidate answering users. In certain examples, the one or more contextual factors may be distinct from the identified one or more topics. Contextual factors may be created and associated with each user of a plurality of users in the question answering system or service.

For example, contextual factors may comprise quasi-demographic characteristics including, but not limited to, a generalized location of residence (e.g., zip code) and a generalized range of household size (e.g., 1-2, 3-4, and 5+). Contextual factors may also comprise affiliation attributes or aspects including, but not limited to, place of employment and organizational membership (e.g., social, philanthropic, and industry memberships or associations).

Contextual factors may also comprise product ownership attributes or aspects including, but not limited to, automobiles, sporting gear, electronic devices, etc. In this regard, commonality of interests may be inferred with commonality of ownership of certain products or items. Contextual factors may also comprise experience attributes or aspects including, but not limited to, placed visited, vacations, and various tasked performed. Other contextual factors and classifications thereof related to a user's background, knowledge, and experience are contemplated as would be understood by a skilled person given the benefit of the present disclosure.

The concept of ranking candidate answering users by matching one or more contextual factors is discussed further in FIG. 4 below.

It is to be understood that information and data to establish or determine one or more contextual factors associated with a user may be accessed from various sources and processes. For example, user profiles associated with a system and one or more services of the system (e.g., server 110 alone or in conjunction with one or more remote servers 120) may be utilized to establish contextual factors. Moreover, information to establish or determine contextual factors may be inferred from a multitude of online queries that a user has performed in the past as well as various web pages that the user has browsed. In some examples, a plurality of online question and answers submitted by a user may be analyzed to determine contextual factors. Identification of entities in such user-submitted online questions and answers may be utilized to determine context factors, for example.

It is to be further understood that the one or more contextual factors may include various hierarchical relationships and links or connections between other contextual factors of a question answering system or service.

In block 210, an online question by an asking user (e.g., electronic device 106) may be routed to at least one of the identified set of candidate answering users. In some examples, the routing may be triggered by the asking user of the online question. In other examples, the routing of the online question may be triggered by an affirmative response by the asking user in response to a question routing prompt or similar inquiry automatically generated when a number of failed related search attempts are detected by the server 110. For example, the asking user may try to perform a few queries, and if unsuccessful, the question answering system may prompt the user performing the queries whether the user wishes to ask a question to one or more users.

In certain implementations, the online question may be routed to a single answering user at a time, for example, the candidate answering user with the highest ranking Thus, an online question by an asking user that is received at server 110 from the asking user's electronic device 106 may be initially routed to a single answering user's electronic device 103. The answering user may be given a predetermined timeframe (e.g., 5 seconds, 10 seconds, 15 seconds, 20 seconds, 30 seconds, 45 seconds, 1 minute, etc.) to acknowledge and respond to the online question. After the predetermined time has expired, the online question may be routed to the next highest ranked candidate answering user.

It is to be understood that in accordance with some aspects that the ranking of candidate answering users may updated during the predetermined timeframe allotted the first user and the next highest ranked candidate answering user may have changed during such timeframe. Alternatively, or in addition, the online question may be routed to a group of candidate answering users simultaneously. In such examples, an online question by an asking user that is received at server 110 from the asking user's electronic device 106 may be simultaneously routed to both a first candidate answering user's electronic device 103 and a second candidate answering user's device 104.

Figure 3:
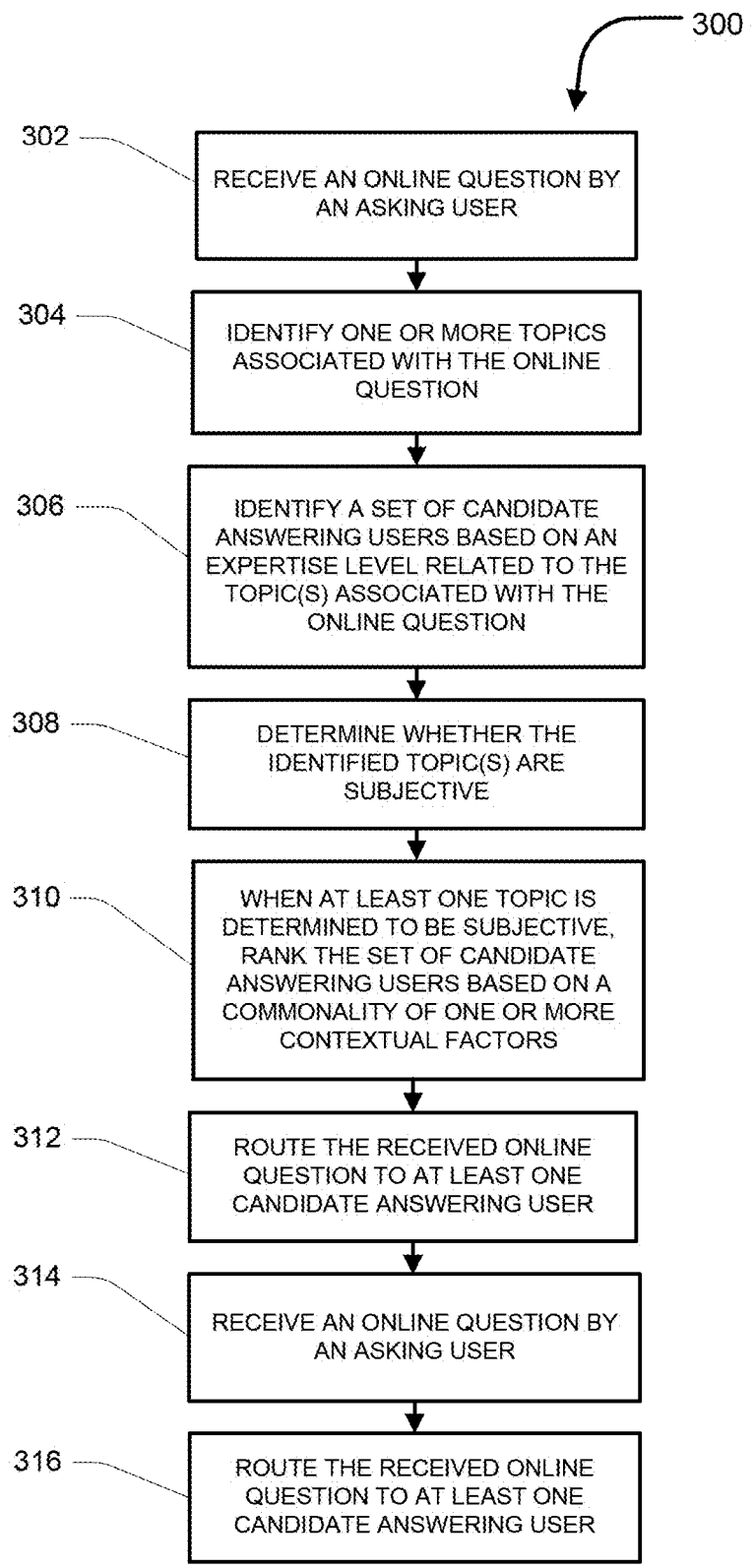
FIG. 3 is a flow diagram illustrating an example method for providing answers to online questions using contextual factor ranking techniques in accordance with various aspects of the subject technology.

FIG. 3 illustrates a flow diagram of another example method for providing answers to online questions using contextual factor ranking techniques. It is to be understood that the operations in method 300 may be used in conjunction with other methods and aspects of the present disclosure. Although method 300 is described with relation to system of FIG. 1, method 300 is not limited to such. In method 300, hosting device, such as server 110, may provide a question answering system of a system or service to one or more participant devices, including but not limited to electronic devices 102, 103, 104, 106. For the explanatory purposes, electronic devices 102, 103, 104 may be associated with an answering user of a previously asked online question or a candidate answering users of an asked online question. Additionally, electronic device 106 may be associated with an asking user (e.g., the user who has previously asked or is asking an online question to be answered directly by other users of the question answering system or service). Each of the electronic devices 102, 103, 104, 106 may establish an individual multimedia session with server 110. Each of electronic devices 102, 103, 104, 106 may further connect to each other via the server 110, or may establish a connection with each other directly via associated network connectivity.

In block 302, an online question by an asking user (e.g., electronic device 106) may be received by server 110. One or more topics of the online question may be identified in block 304. In block 306, candidate answering users (e.g., electronic devices 102, 103, 104) may be identified based on an expertise level of each user of the plurality of users. The expertise associated with the expertise level may be matched or related to the identified one or more topics of the received online question.

In block 308, server 110 may determine whether the identified one or more topics are subjective topics. For example, each topic may include an identifier to indicate whether the topic is predominately an objective topic or a subjective topic. In block 310, when at least one of the identified one or more topics of the online question is determined to be a subjective question, the set of candidate answering users may be ranked based on a commonality of one or more contextual factors between the asking user and the set of candidate answering users. In block 312, the online question by an asking user may be routed to at least one of the identified set of candidate answering users.

In block 314, server 110 may receive a follow-up online question by the asking user (e.g., electronic devices 106). In block 316, the follow-up online question by asking user (e.g., electronic device 106) may be routed to the answering user (e.g., electronic devices 102, 103, 104). In this regard, follow-up questions by the original asking user to the answering user may have a high likelihood of being properly answered as the shared context and background between users increases the probability that answering user will be capable of fielding the follow-up question as well without any further analysis (e.g., using only the topical analysis completed for the original online question).

Figure 4:
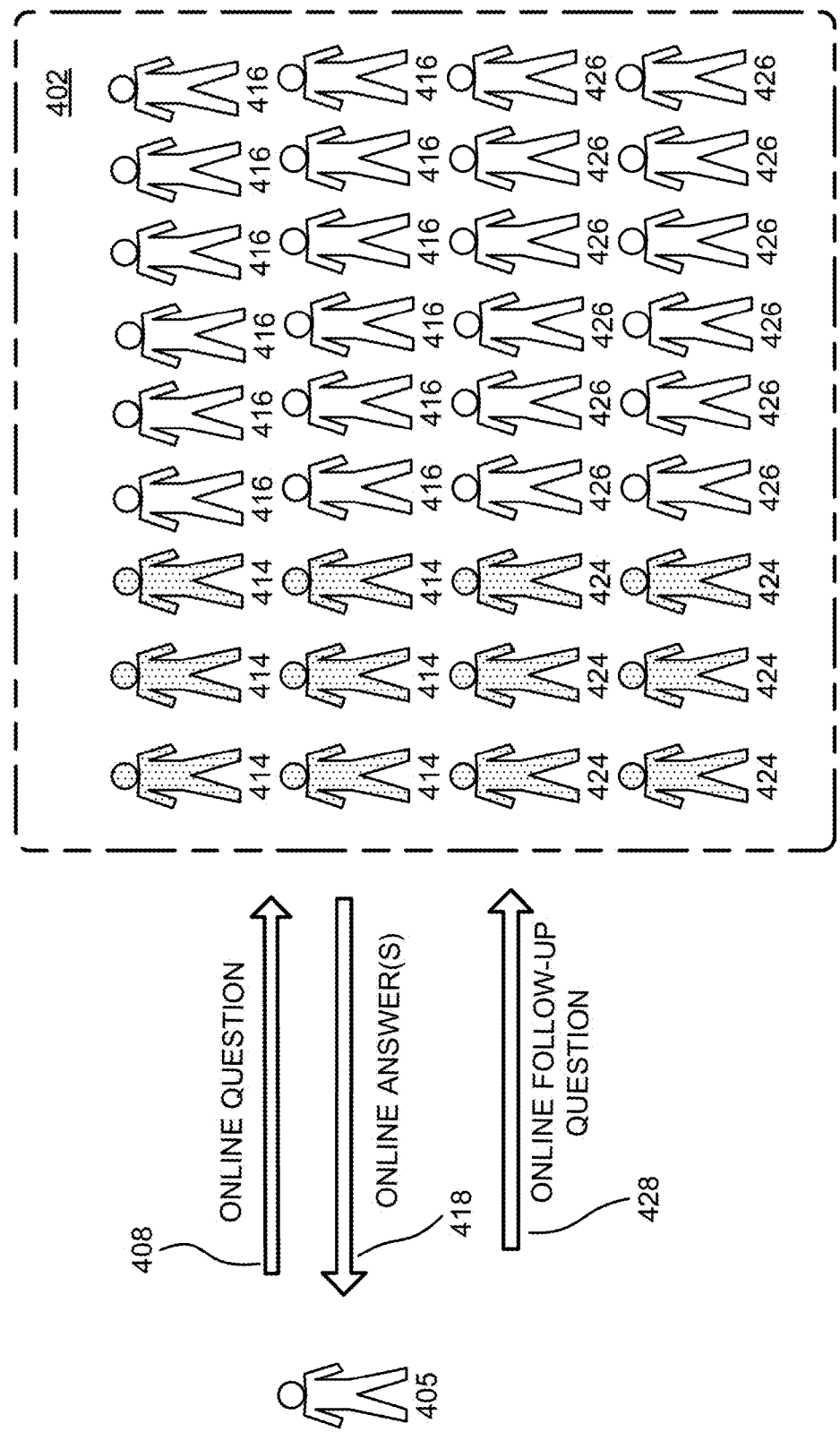
FIG. 4 is a diagram illustrating example techniques for ranking users to answer another user's online question based on contextual factors and expertise levels in accordance with various aspects of the subject technology.

FIG. 4 is a diagram illustrating example techniques for ranking users to answer another user's online question based on contextual factors. Certain aspects of the diagram of FIG. 4 may be described with relation to system of FIG. 1, however, the diagram of FIG. 4 is not limited to such. According to aspects of the subject technology, an asking user 405 may submit an online question 408 to a plurality of users, for example, a pool of expert users 402 selected from the plurality of users of a question answering system or service (e.g., server 110). Such a pool of expert users 402 may be incorporated into an expert-interest relationship or graph system of the question answering system, for example.

The pool of expert users 402 potentially available to answer an online question 408 of the asking user 405 may comprise users 414, 416, 424, and 426 characterized by various contextual factors and expertise levels. For example, in the pool of expert users 402, users 414, 416 may be considered as having the most expertise in the topic or topics related to the online question 408. Users 424, 426 may be deemed as having adequate expertise in the topic or topics related to the online question 408, such that users 424, 426 would be considered as candidate answering users along with users 414, 416.

However, users 414, 424 are deemed to share one or more contextual factors with asking user 405. Accordingly, while users 414 and users 416 are determined to have the same level of expertise on the particular topic, users 414 share context and background with asking user 405 and users 416 are deemed to not share any context or background with asking user 405. Similarly, while users 424 and users 426 are determined to have the same level of expertise on the particular topic (albeit a lower level than users 414, 416), users 424 share context or background with asking user 405 and users 426 are deemed to not share any context or background with asking user 405.

Therefore, in certain examples, when a topic or topics of an online question 408 are of an objective nature. Users 414 and users 416 may be similarly ranked high in the order of candidate answering users that are to be connected to the asking user 405, regardless of the contextual association of users 414 with asking user 405. Similarly, users 424 and users 426 may be similarly ranked in the order of candidate answering users that are to be connected to the asking user 405, regardless of the contextual association of users 424 with asking user 405. However, absent other factors relating to the selection and ranking of candidate answering users, users 416 would likely be ranked higher users 424 when the online question 408 relates to a predominantly objective topic.

However, when a topic or topics of an online question 408 are of a subjective nature. Users 414 may be ranked higher than users 416 in the order of candidate answering users that are to be connected to the asking user 405, due to the contextual association of users 414 with asking user 405. Similarly, users 424 may be ranked higher than users 426 in the order of candidate answering users that are to be connected to the asking user 405, due to the contextual association of users 424 with asking user 405. Moreover, in some implementations, when the online question 408 relates to a substantially or predominantly subjective topic, users 416, 426 may be not even be selected as candidate answering users due to their lack of any contextual association with the asking user 405 despite the fact that users 416, 426 are deemed to have an adequate level of expertise to answer the online question 408. In fact, user 416 may be deemed to have more experience regarding the topic in general than users 424.

In accordance with other aspects, the weighing of the contextual factors may be related to a level of subjectivity of the online question 408 being asked by the asking user. For example, the contextual factors may be given greater weight when the received online question is predominantly subjective.

For example, asking user 405 may be a person residing in Zip Code 11111 and asks an online question 408 regarding new hairstyles to try. The online question 408 can be determined to be a predominantly subjective. In certain examples, candidate answering users may comprise user 414 who has a very high expertise level related to the topic of hairstyles or fashion in general (e.g., based on occupation or user rating from previously asked questions) and resides in Zip Code 11111; user 416 who has a very high expertise level related to the topic of hairstyles and resides in Zip Code 19999, which is over 1,000 miles away from Zip Code 11111; user 424 who has a high expertise level related to the topic of hairstyles and resides in Zip Code 11111; and user 426 who has a high expertise level related to the topic of hair styles and resides in Zip Code 11122, which is about 50 miles away from Zip Code 11111.

Accordingly, user 414 may be ranked ahead of user 416 as a candidate answering user due to the shared one or more contextual factors with asking user 405. For example, it can be inferred that hairstyles in distant geographical areas may vary substantially and that user 405 would prefer a recommendation from answering user who resides in that same general area or community. Similarly, user 424 may be ranked ahead of user 426 as a candidate answering user due to the shared one or more contextual factors with asking user 405.

In some examples, online question 408 may be submitted to user 414 and user 424, before (or to the exclusion of) user 416 and user 426. It is to be understood that users 414 and 416 are deemed to have the same very high expertise level (e.g., both may be hairstylists and have received excellent reviews from their customers or user rating from previously asked online questions). Similarly, user 424 and 426 are both deemed to have the same high level of expertise. However, the benefit of incorporation contextual factors can be seen as asking user 405 is more likely to receive a more relevant online answers 418 from user 414 and user 424. Moreover, as can be seen in the above examples, the one or more shared contextual factors may be distinct from the topic of the online question 408.

It is to be further appreciated that when an asking user 405 is matched to a candidate answering user based on a commonality of contextual factors, one or more follow-up questions 428 by the asking user 405 will have a greater possibility being satisfactorily answered. For example, with regard to user 424 and user 426 described above, there may or may not be any discernible hairstyle variations due to the relatively close geographic locations of these users (e.g., the contextual factor may not have a substantial relevance to the online question 408 in some instances). However, user 424 may be better suited to provide an answer to one or more follow-up questions 428 by the asking user 405 (e.g., what salons do you recommend?).

In another example, an initial online question 408 may be somewhat broader (e.g., What city has the best vacation weather in August?) and possibly have a wider range of answering users, for which many users may be competent to answer (e.g., either user 424 or user 426 who may both be frequent travelers and deemed to have the same high expertise level). Thus, it may be considered that either user 424 or user 426 could provide an online answer 418 with equally competence. However, a follow-up question 428 from asking user 405 (e.g., Where is a good place to stay with a large family?) will likely be more subjective based upon certain contextual factors of the asking user 405.

Accordingly, if asking user 405 has a contextual factor (e.g., a household size range of 5+) matching user 424 (e.g., also with a household size range of 5+), but does not have a matching a contextual factor with user 426 (e.g., a household size range of 1-2), then anticipated follow-up questions 428 by the asking user 405 will likely be better handled by user 424 and another user in the pool of expert users 402 will not need to be additionally consulted to address the follow-up question 428.

In this regard, one or more contextual factors may be determined to have some relevancy to a particular subjective topic of the online question 408, while still being distinct from the actual subject matter of that particular subjective topic. Such relevant contextual factors can be used to match the asking user 405 with the best candidate answering users from the pool of expert users 402. In some instances, the contextual factors may have some relation to the expertise level of the candidate answering users (e.g., when the topic of the online question 405 includes some objectivity in addition to subjectivity). For example, an asking user 405 may ask an online question 408 requesting which is the best consumer electronics show to attend, and contextual factors with which to match a candidate answering user from the pool of expert users 402 may include a place of employment or industry membership.

In other instances, the contextual factors may have little or no relation to the expertise level of the candidate answering users. For example, an asking user 405 may ask an online question 408 requesting where is the best area to camp in the XYZ national forest of State X, and the contextual factors with which to match a candidate answering user from the pool of expert users 402 may include sporting goods owned (e.g., commonality in ownership of types of 4×4 vehicles, types of tents owned, types of backpacks owned, or types of other sporting goods owned such as fishing poles, mountain bikes, dirt bikes, etc.) or other places previously camped or visited.

As can be understood from the examples above, many users may be deemed to have the same or very similar expertise levels when a topic or subtopic related to an online question is classified more broadly. Accordingly, in some implementations, shared contextual factors may be used as a boost to the user's expertise level (or other factor) in a combination of weighted factors or otherwise increase a ranking of a candidate answering user (e.g., twiddling the ranking of the candidate answering user based on a commonality of one or more contextual factors).

Further, it is to be understood that contextual factor techniques described above to rank candidate answering users may be used in combination with other techniques for selecting and ranking candidate answering users. For example, ranking the candidate answering users, as well as routing the online question 408 to one or more candidate answering users, may be based on a variety of aspects such as, but not limited to, the candidate answering user's present search engagement status (e.g., whether the user is actively engaged in a search task), present location (e.g., whether the user is at home, commuting, at work, or waiting in line), search savvyness (e.g., a user's ability to effectively conduct an online search), recent similar search experience (e.g., recently-acquired relevant search experience in a topic similar to the asking user), expertise level, or a combination thereof. Each of these factors may themselves be assigned a particular weighting or proportionality associated with ranking techniques.

Furthermore, in providing answers to online questions information related to expert-interest relationships may be used. As noted above, a factor considered when ranking candidate answering users is the expertise level of the user. In this regard, interest attributes determined to be associated with the online question may be matched with the expertise level of the pool of expert users 402 available as candidate answering users.

An expertise level associated with various interest attributes may be determined by server 110 or server 120 for each user in a question answering system. In this regard, various implementations of expert-interest relationship information, such as but not limited to expert-interest graphs, may be formed from historical data. Such data may be gathered based on a particular user's past search activity, express indications, and previous answer accuracy, for example, to generate an expert-interest relationship associated with that particular user.

In some examples, the topic or topics of the online question 408 may be matched to the expertise level of users identified as potential candidate answering users. The candidate answering users may be ranked based on the expertise level of the candidate answering users. In this regard, the expertise levels may be determined based on the topic or topics identified as being present in the online question.

Figure 5:
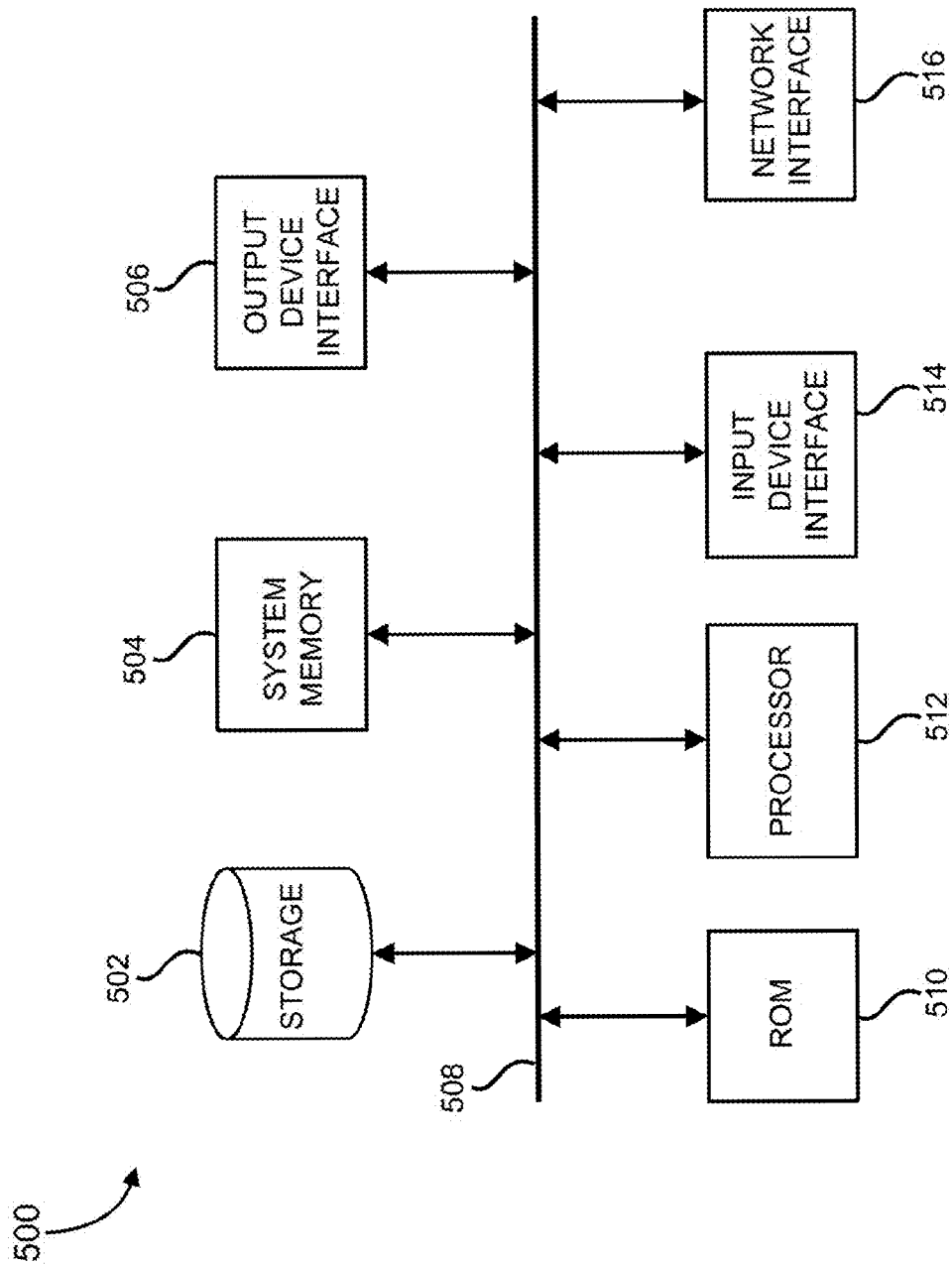
FIG. 5 conceptually illustrates an electronic system with which some aspects of the subject technology are implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units may include instructions for processing, ranking, and routing online questions in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer.

These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:

1. A computer-implemented method comprising:
   receiving, on one or more processors, an online question from an asking user;
   identifying, by the one or more processors, one or more topics of the received online question;
   identifying, by the one or more processors, a first set of candidate answering users from a plurality of users, the first set of candidate answering users excluding commonality with the asking user;

identifying, by the one or more processors, a second set of candidate answering users from the plurality of users, the second set of candidate answering users sharing one or more contextual factors with the asking user, the one or more contextual factors being distinct from the identified one or more topics, the first set of candidate answering users having an expertise level same as that of the second set of candidate answering users, the expertise level being related to the identified one or more topics of the received online question;

determining, by the one or more processors, whether the identified one or more topics are subjective topics;

ranking, by the one or more processors, in a case where the identified one or more topics are subjective topics, the second set of candidate answering users higher than the first set of candidate answering users; and ranking, by the one or more processors, in a case where the identified one or more topics are not subjective topics, the first set of candidate answering users to a same order as the second set of candidate answering users.

2. The method of claim 1, further comprising:
routing the received online question to at least one candidate answering user of the ranked first set of candidate answering users or the ranked second set of candidate answering users.

3. The method of claim 1, wherein the one or more contextual factors correspond to quasi-demographic characteristics.

4. The method of claim 3, wherein at least one of the quasi-demographic characteristics is associated with a residential zip code.

5. The method of claim 1, wherein the one or more contextual factors correspond to affiliation attributes.

6. The method of claim 1, wherein the one or more contextual factors correspond to experience attributes.

7. The method of claim 1, further comprising:
identifying a third set of candidate answering users from the plurality of users;

ranking, in a case where the identified one or more topics are not subjective topics, the first set of candidate answering users higher than the third set of candidate answering users, wherein commonality of one or more contextual factors is greater between the third set of candidate answering users and the asking user than between the first set of candidate answering users and the asking user, and wherein the expertise level of the third set of candidate answering users is lower than the expertise level of the first set of candidate answering users; and ranking, in a case where the identified one or more topics are subjective topics, the third set of candidate answering users higher than the first set of candidate answering users.

8. A computer-implemented method comprising:
receiving, on one or more processors, an online question from an asking user;

identifying, by the one or more processors, one or more topics of the received online question;

identifying, by the one or more processors, a first set of candidate answering users from a plurality of users, the first set of candidate answering users excluding commonality with the asking user;

identifying, by the one or more processors, a second set of candidate answering users from the plurality of users, the second set of candidate answering users sharing one or more contextual factors with the asking user, the first set of candidate answering users having an expertise level same as that of the second set of candidate answering users, the expertise level being related to the identified one or more topics of the received online question;

determining, by the one or more processors, whether the identified one or more topics of the received online question are subjective topics;

when at least one topic of the identified one or more topics of the received online question is determined to be subjective topics, ranking, by the one or more processors, the second set of candidate answering users higher than the first set of candidate answering users; and when the at least one topic of the identified one or more topics of the received online question is determined not to be subjective topics, ranking, by the one or more processors, the first set of candidate answering users to a same order as the second set of candidate answering users, wherein the one or more contextual factors are distinct from the identified one or more topics.

9. The method of claim 8, further comprising:
routing the received online question to at least one candidate answering user of the ranked first set of candidate answering users or the ranked second set of candidate answering users;

receiving, subsequent to routing the received online question, a follow-up online question from the asking user; and routing the received follow-up online question to the at least one candidate answering user.

10. A system comprising:
one or more processors; and
a memory including instructions that, when executed by the one or more processors, cause the one or more processors to:

receive an online question from an asking user;

identify one or more topics of the received online question;

identify a first set of candidate answering users from a plurality of users, the first set of candidate answering users excluding commonality with the asking user;

identify a second set of candidate answering users from the plurality of users, the second set of candidate answering users sharing one or more contextual factors, the one or more contextual factors being distinct from the identified one or more topics, the first set of candidate answering users having an expertise level same as that of the second set of candidate answering users, the expertise level being related to the identified one or more topics of the received online question;

determine whether the identified one or more topics are subjective topics;

rank, in a case where the identified one or more topics are subjective topics, the second set of candidate answering users higher than the first set of candidate answering users; and rank, in a case where the identified one or more topics are not subjective topics, the first set of candidate answering users to a same order as the second set of candidate answering users.

11. The system of claim 10, wherein the instructions that, when executed by the one or more processors, further cause the one or more processors to:

route the received online question to at least one candidate answering user of the ranked first set of candidate answering users or the ranked second set of candidate answering users.

12. The system of claim 10, wherein the one or more contextual factors correspond to quasi-demographic characteristics.

13. A system comprising:
one or more processors; and
a memory including instructions that, when executed by the one or more processors, cause the one or more processors to:
receive an online question from an asking user;
identify one or more topics of the received online question;
identify a first set of candidate answering users from a plurality of users, the first set of candidate answering users excluding commonality with the asking user;
identify a second set of candidate answering users from the plurality of users, the second set of candidate answering users sharing one or more contextual factors with the asking user, the first set of candidate answering users having an expertise level same as that of the second set of candidate answering users, the expertise level being related to the identified one or more topics of the received online question;
determine whether the identified one or more topics of the received online question are subjective topics;
when at least one topic of the identified one or more topics of the received online question is determined to be subjective topics, rank the second set of candidate answering users higher than the first set of candidate answering users; and
when the at least one topic of the identified one or more topics of the received online question is determined not to be subjective topics, rank the first set of candidate answering users to a same order as the second set of candidate answering users, wherein the one or more contextual factors are distinct from the identified one or more topics.

14. The system of claim 13, wherein the instructions that, when executed by the one or more processors, further cause the one or more processors to:
route the received online question to at least one candidate answering user of the ranked first set of candidate answering users or the ranked second set of candidate answering users;
receive, subsequent to routing the received online question, a follow-up online question from the asking user; and
route the received follow-up online question to the at least one candidate answering user.

15. A non-transitory machine-readable medium comprising instructions stored therein, which when executed by a machine, cause the machine to perform operations, the non-transitory machine-readable medium comprising:
instructions for receiving an online question from an asking user;
instructions for identifying one or more topics of the received online question;
instructions for identifying a first set of candidate answering users from a plurality of users, the first set of candidate answering users excluding commonality with the asking user;
instructions for identifying a second set of candidate answering users from the plurality of users, the second set of candidate answering users sharing one or more contextual factors with the asking user, the first set of candidate answering users having an expertise level same as that of the second set of candidate answering users, the expertise level being related to the identified one or more topics of the received online question;
instructions for identifying a third set of candidate answering users from the plurality of users;
instructions for determining whether the identified one or more topics are subjective topics;
instructions for ranking, in a case where the identified one or more topics are subjective topics, the second set of candidate answering users and the third set of candidate answering users higher than the first set of candidate answering users, wherein the one or more contextual factors are distinct from the identified one or more topics; and
instructions for ranking, in a case where the identified one or more topics are not subjective topics, the first set of candidate answering users and the second set of candidate answering users higher than the third set of candidate answering users, wherein commonality of one or more contextual factors is greater between the third set of candidate answering users and the asking user than between the first set of candidate answering users and the asking user, and wherein the expertise level of the third set of candidate answering users is lower than the expertise level of the first set of candidate answering users.

16. The non-transitory machine-readable medium of claim 15, further comprising:
instructions for routing the received online question to at least one candidate answering user of the ranked first set of candidate answering users, the ranked second set of candidate answering users or the ranked third set of candidate answering users.

17. The non-transitory machine-readable medium of claim 15, wherein the one or more contextual factors correspond to quasi-demographic characteristics.

18. A non-transitory machine-readable medium comprising instructions stored therein, which when executed by a machine, cause the machine to perform operations, the non-transitory machine-readable medium comprising:
instructions for receiving an online question from an asking user;
instructions for identifying one or more topics of the received online question;
instructions for identifying a first set of candidate answering users from a plurality of users, the first set of candidate answering users excluding commonality with the asking user;
instructions for identifying a second set of candidate answering users from the plurality of users, the second set of candidate answering users sharing one or more contextual factors with the asking user, the first set of candidate answering users having an expertise level same as that of the second set of candidate answering users, the expertise level being related to the identified one or more topics of the received online question;
instructions for determining whether the identified one or more topics of the received online question are subjective topics;
instructions for ranking, when at least one topic of the identified one or more topics of the received online question is determined to be subjective topics, the second set of candidate answering users higher than the first set of candidate answering users; and
instructions for ranking, when the at least one topic of the identified one or more topics of the received online question is determined not to be subjective topics, the first set of candidate answering users to a same order as the second set of candidate answering users, wherein the one or more contextual factors are distinct from the identified one or more topics.

19. The non-transitory machine-readable medium of claim 18, further comprising:
- instructions for routing the received online question to at least one candidate answering user of the ranked first set of candidate answering users or the ranked second set of candidate answering users;
- instructions for receiving, subsequent to routing the received online question, a follow-up online question from the asking user; and
- instructions for routing the received follow-up online question to the at least one candidate answering user.

* * * * *